US007796355B2

(12) United States Patent
Benakli et al.

(10) Patent No.: US 7,796,355 B2

(45) Date of Patent: Sep. 14, 2010

(54) REVERSE WRITE CURRENT PRESHOOT

(75) Inventors: Mourad Benakli, Shrewsbury, MA (US); Richard E. Olsen, Framingham, MA (US); Jason Wolfson, Shrewsbury, MA (US); Ahmet Kaya, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 865 days.

(21) Appl. No.: 11/607,534

(22) Filed: Dec. 1, 2006

(65) Prior Publication Data

US 2007/0165320 A1 Jul. 19, 2007

Related U.S. Application Data

(60) Provisional application No. 60/741,303, filed on Dec. 1, 2005, provisional application No. 60/772,335, filed on Feb. 10, 2006.

(51) Int. Cl.
*G11B 5/02* (2006.01)

(52) U.S. Cl. .......................................................... 360/68

(58) Field of Classification Search ....................... None
See application file for complete search history.

(56) References Cited

U.S. PATENT DOCUMENTS

| | | | | |
|---|---|---|---|---|
| 6,512,649 | B1 | 1/2003 | Alini et al. | |
| 6,995,950 | B2 | 2/2006 | Lairson et al. | |
| 2004/0257688 | A1 * | 12/2004 | Nakamura | 360/46 |

* cited by examiner

*Primary Examiner*—Daniell L Negrón
(74) *Attorney, Agent, or Firm*—Theodore M. Magee; Westman, Champlin & Kelly, P.A.

(57) ABSTRACT

Methods of generating a write current in response to a write command include generating a reverse preshoot write current having a polarity opposite to a polarity for generating a magnetic transition corresponding to the write command, and then generating a write current to effect the magnetic transition corresponding to the write command. The write current may be used for writing data to a storage disk of a disk drive that includes a write head configured to apply a magnetic field to the storage disk responsive to write currents. A preamplifier circuit includes a write current generator configured to receive a write current command and configured to generate, responsive to the write current command, a reverse preshoot current having a first polarity that is opposite a second polarity for generating a magnetic transition corresponding to the write command.

19 Claims, 10 Drawing Sheets

500 Mb/s
Output Signal (V)
8
6
4
2
0
-2
-4
-6
-8
510
520
530
0
1E-09
2E-09
3E-09
4E-09
5E-09
Time(s)

REVERSE WRITE CURRENT PRESHOOT

RELATED APPLICATION

This application claims the benefit of and priority to U.S. Provisional Patent Application No. 60/741,303, filed Dec. 1, 2005, and U.S. Provisional Patent Application No. 60/772,335, filed Feb. 10, 2006, the disclosures of which are hereby incorporated herein by reference as if set forth in their entirety.

FIELD OF THE INVENTION

The present invention generally relates to digital data storage devices and, more particularly, to a disk drive and related methods for varying write current parameters that are used to write data on a disk.

BACKGROUND

A simplified diagrammatic representation of a disk drive, generally designated as 10, is illustrated in FIG. 1. The disk drive 10 includes a data storage disk 12 that is rotated by a spindle motor 14. The spindle motor 14 is mounted to a base plate 16. An actuator arm assembly 18 is also mounted to the base plate 16. The actuator arm assembly 18 includes a head 20 (or transducer) mounted to a flexure arm 22 which is attached to an actuator arm 24 that can rotate about a pivot bearing assembly 26.

The actuator arm assembly 18 also includes a voice coil motor (VCM) 28 which moves the head 20 relative to the disk 12. The spin motor 14, and actuator arm assembly 18 are coupled to a number of electronic circuits 30 mounted to a printed circuit board 32. The electronic circuits 30 can include, for example, a digital signal processor (DSP), a microprocessor-based controller and a random access memory (RAM) device. Although a single disk 12 is illustrated in FIG. 1, the disk drive 10 may instead include a plurality of disks. For example, FIG. 2 illustrates a disk stack 15 that includes a plurality of disks 12, each of which may have a pair of data storage surfaces 36. The disks 12 are mounted on a cylindrical shaft and are designed to rotate about axis 38. The spin motor 14 as mentioned above, rotates the disk stack 15.

Referring now to the illustration of FIGS. 1-3, the actuator arm assembly 18 includes a plurality of heads 20, each of which correspond to one of the disk surfaces 36. Each head 20 is mounted to a corresponding flexure arm 22 which is attached to a corresponding portion of the actuator arm 24 that can rotate about the pivot bearing assembly 26. The VCM 28 operates to move the actuator arm 24, and thus moves the heads 20 relative to their respective disk surfaces 36. The heads 20 are configured to fly adjacent to the disk surfaces 36 on air bearings.

FIG. 4 further illustrates one of the disks 12. Data is stored on the disk 12 within a number of concentric tracks 40 (or cylinders). Each track is divided into a plurality of radially extending sectors 42 on the disk 12. Each sector 42 is further divided into a servo sector 44 and a data sector 46. The servo sectors 44 of the disk 34 are used to, among other things, accurately position the head 20 so that data can be properly written onto and read from the disk 12. The data sectors 46 are where non-servo related data (i.e., user data) is stored and retrieved. Such data, upon proper conditions, may be overwritten.

To accurately write data to and read data from the data sectors 46 of the disk 12, it is desirable to maintain the head 20 at a relatively fixed position with respect to a centerline of a designated track 40 during writing and reading operations (called a track following operation). To assist in controlling the position of the head 20 relative to the tracks 40, the servo sectors 44 contain, among other things, servo information in the form of servo burst patterns that include one or more groups of servo bursts, as is well-known in the art.

Data is written on the disk 12 by the electronic circuits 30 generating a write current that is conducted through a coil in the head 20. In response to the write current, the head 20 generates a magnetic flux that writes (i.e., sets) a magnetic state of an adjacent area of the surface 36 of the disk 12. The direction of the write current is switched to cause a corresponding change in the written magnetic state. With the trend toward writing data at increasingly high data rates and with decreased gap between the head 20 and disk 12, it may become increasingly important to provide higher rates of control of the write current parameters.

Moreover, at high data rates, the magnetic field that may be generated in the disk media in response to the write current becomes limited by the switching speed of the write head structure. In particular, the write head switching speed may limit the magnetic field generated in the disk media at data rates exceeding 1.5 Gb/s, as shown in FIG. 5, which is a graph of the maximum effective field versus data rate. In order to overcome this limitation, it is known to increase the write current. For example, as shown in FIG. 6, an increase in write current Iw results an increase in the media magnetization at a 2 GHz switching speed.

FIG. 6 is a graph of media magnetization versus time for various write currents applied at a 2 GHz write cycle. For example, curve 61 corresponds to a write current of 60 mA, while curve 62 corresponds to a write current of 120 mA and curve 63 corresponds to a write current of 240 mA. In general, higher write currents may result in higher peak media magnetization as well as a steeper slope of the media magnetization curve. For example, in FIG. 6, the highest peak media magnetization occurs with the highest write current (240 mA). However, increased write currents may result in an increase in the effective magnetic write width (MWW) onto the disk media. Thus, increased write currents may increase the occurrence of adjacent track erasures. Increased write currents may also result in higher power consumption and/or excess heat generation in the disk drive.

SUMMARY

Some embodiments of the invention provide methods of writing data to a storage disk of a disk drive that includes a write head configured to apply a magnetic field to the storage disk responsive to write currents. The methods include applying a reverse preshoot write current to the write head responsive to a write command, the reverse preshoot current having a polarity opposite to a polarity for generating a magnetic transition corresponding to the write command, and then applying a write current to the write head to effect the commanded magnetic transition.

The disk drive may include a preamplifier coupled to the write head, and the methods may further include receiving the write command at the preamplifier, the write command indicating that the magnetic transition may be to be written to the storage disk, and generating the reverse preshoot write current in response to the write command.

Applying the write current to the write head may include applying an overshoot current to the write head after applying the reverse preshoot write current, and applying a steady state write current after the overshoot current.

The reverse preshoot write current may have a magnitude that may be greater than, less than, or about equal to a magnitude of the overshoot current. The reverse preshoot write current may have a magnitude that is at least about 10% greater than the steady state current level. In some embodiments, the reverse preshoot write current may exceed the steady state current level by an amount that is at least about 10% of the level by which the overshoot current exceeds the steady state current level.

The overshoot current and the steady state write current may have a polarity that is opposite the polarity of the reverse preshoot write current.

The methods may further include generating the reverse preshoot write current, and generating the reverse preshoot write current may include generating a data source signal, delaying the data source signal, and scaling the data source signal.

Delaying the data source signal may include delaying the data source signal by a first delay and scaling the data source signal may include scaling the data source signal by a first scale factor, and the methods may further include generating an overshoot current. Generating the overshoot current may include delaying the data source signal by a second delay that may be longer than the first delay and scaling the data source signal by a second scale factor. The reverse preshoot write current and the overshoot current may be combined.

The methods may further include generating a third current signal by delaying the data source signal by a third delay that is longer than the second delay and scaling the data source signal by a third scale factor, and combining the third current signal with the overshoot current and the reverse preshoot write current.

The methods may further include receiving a data input, generating a baseline current in response to the data input, generating a control signal, generating a reverse preshoot write current in response to the control signal, and combining the baseline current and the reverse preshoot write current.

The methods may further include generating a current overshoot in response to the control signal, and combining the current overshoot with the baseline current and the reverse preshoot write current.

Methods of recording a magnetic signal on a magnetic medium of a disk drive having a write head configured to apply magnetic fields to the magnetic medium according to some embodiments of the invention include generating a write current signal having a dual peak configuration, and applying the write current signal having the dual peak configuration to the write head.

The write current signal may include a first peak corresponding to a current overshoot signal and a second peak occurring after the first peak and corresponding to a reverse preshoot write current.

The first peak may be higher than, lower than, or about the same height as the second peak.

A disk drive according to some embodiments of the invention includes a rotatable data storage disk, a head configured to write data to and read data from the disk, a controller configured to generate a write current command indicating that a desired magnetic transition is to be written to the magnetic medium. The disk drive further includes a preamplifier configured to receive the write current command from the controller, configured to generate, responsive to the write current command, a reverse preshoot current having a first polarity that may be opposite a second polarity for generating the magnetic transition, and configured to apply the reverse preshoot current to the write head.

The preamplifier may be further configured to generate a primary current having the second polarity, and to apply the primary current to the write head after applying the reverse preshoot current to the write head.

The preamplifier may be further configured to generate an overshoot current having a polarity that is the same as the primary current, and to apply the overshoot current signal to the write head after the reverse preshoot current.

The reverse preshoot write current may have a magnitude that is greater than, less than or about equal to a magnitude of the overshoot current.

A disk drive according to further embodiments of the invention includes a rotatable data storage disk, a head configured to write data to and read data from the disk, and a controller configured to generate a write current command including a primary current command having a first polarity selected to produce a magnetic transition on the disk and a reverse preshoot current command having a second polarity that is opposite the first polarity.

The disk drive may further include a preamplifier coupled to the controller and configured to receive the write current command, and the controller may be further configured to apply the reverse preshoot current command to the preamplifier and then to apply the primary current command to the preamplifier.

The controller may be further configured to generate an overshoot current command having the first polarity, and to apply the overshoot current command to the preamplifier after the reverse preshoot current command.

The reverse current preshoot command may have a magnitude that is greater than, less than or about equal to a magnitude of the overshoot current command.

The controller may be further configured to generate the reverse current preshoot command by generating a data source signal, delaying the data source signal by a first delay, and scaling the data source signal by a first scale factor, and to generate the primary current command by delaying the data source signal by a second delay that may be longer than the first delay, and scaling the data source signal by a second scale factor.

A disk drive according to further embodiments of the invention includes a rotatable data storage disk, a head configured to write data to and read data from the disk, a baseline circuit configured to receive an input data signal and to responsively generate a baseline current signal and a control signal, a reverse preshoot current circuit configured to generate a reverse preshoot write current signal in response to the control signal, and a combiner configured to combine the baseline current signal and the reverse preshoot write current signal.

The disk drive may further include an overshoot circuit configured to generate a current overshoot signal in response to the control signal, and the combiner may be further configured to combine the current overshoot signal with the baseline current signal and the reverse preshoot write current signal.

The reverse preshoot current circuit may be configured to invert the input data signal, to filter the input data signal, to differentiate the input data signal, and to delay the input data signal to provide the reverse preshoot write current signal.

The current overshoot circuit may be configured to filter the input data signal, to differentiate the input data signal, and to delay the input data signal to provide the current overshoot signal.

Methods of generating a write current in response to a write command according to some embodiments of the invention include generating a reverse preshoot write current having a polarity opposite to a polarity for generating a magnetic transition corresponding to the write command, and then generating a write current to effect the magnetic transition corresponding to the write command.

Some embodiments of the invention provide methods of recording a magnetic signal on a magnetic medium of a disk drive having a write head configured to apply magnetic fields to the magnetic medium. The methods include generating a write current signal having a dual peak configuration, and applying the write current signal having the dual peak configuration to the write head.

A preamplifier circuit according to some embodiments of the invention includes a write current generator configured to receive a write current command and configured to generate, responsive to the write current command, a reverse preshoot current having a first polarity that is opposite a second polarity for generating a magnetic transition corresponding to the write command.

The write current generator may be configured to generate a primary current having the second polarity, and to apply the primary current after applying the reverse preshoot current.

The write current generator may be further configured to generate an overshoot current having a polarity that is the same as the primary current, and to apply the overshoot current signal after the reverse preshoot current.

The write current generator may include a baseline circuit configured to receive an input data signal and to responsively generate a baseline current signal and a control signal, a reverse preshoot current circuit configured to generate a reverse preshoot write current signal in response to the control signal, and a combiner configured to combine the baseline current signal and the reverse preshoot write current signal.

The write current generator may further include an overshoot circuit configured to generate a current overshoot signal in response to the control signal. The combiner may be further configured to combine the current overshoot signal with the baseline current signal and the reverse preshoot write current signal.

The reverse preshoot current circuit may be configured to invert the input data signal, to filter the input data signal, and to differentiate the input data signal, and to delay the input data signal to provide the reverse preshoot write current signal.

The write current generator may include a current generator configured to generate the reverse preshoot current in response to the write command, a current generator configured to generate a steady state current in response to the write command, wherein the steady state current is delayed relative to the reverse preshoot current.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

Figure 1:
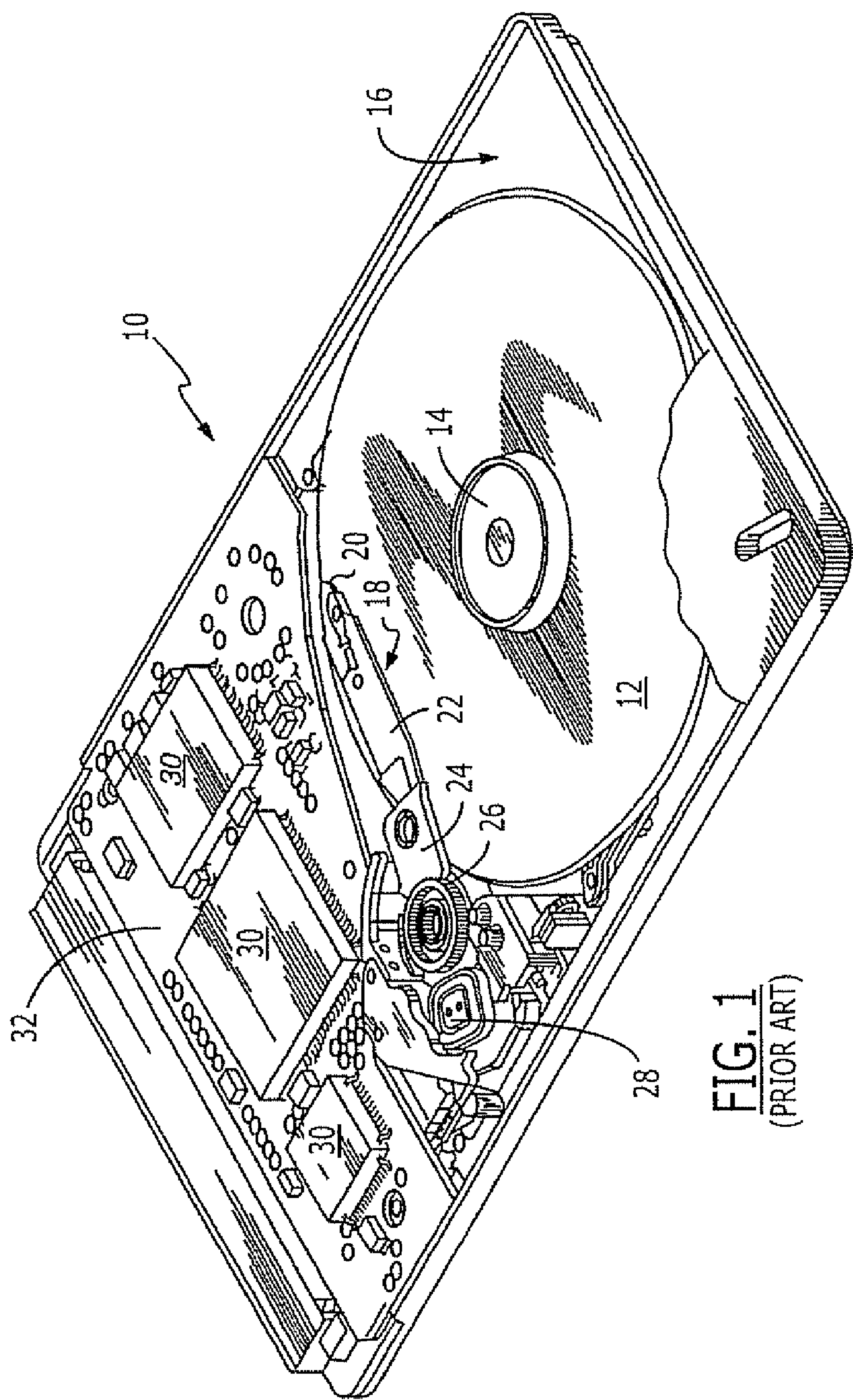
FIG. 1 is a perspective view of a conventional disk drive.
Figure 2:
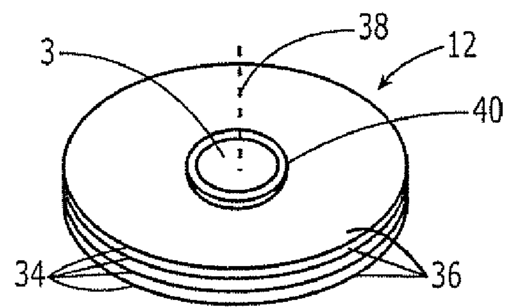
FIG. 2 is a perspective view of a conventional disk stack having a plurality of disks.
Figure 3:
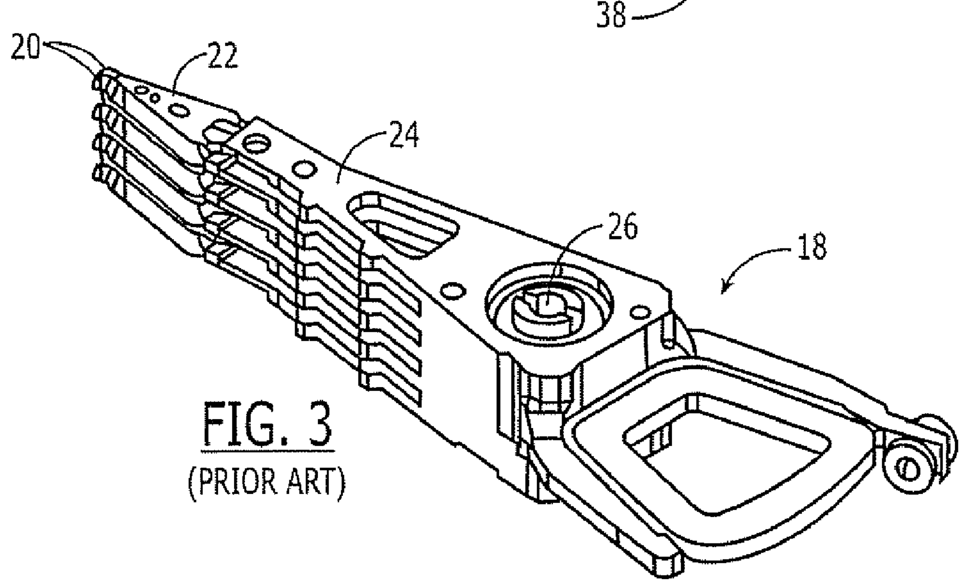
FIG. 3 is a perspective view of a portion of an actuator arm assembly having a plurality of actuator arms.
Figure 4:
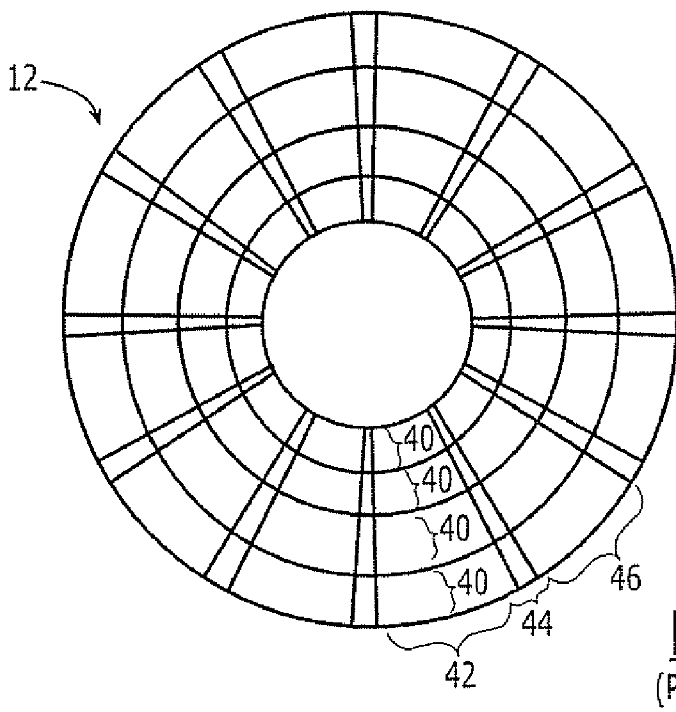
FIG. 4 is a top view of a conventional disk and illustrates tracks and sectors, with each of the sectors being divided into a servo sector and a data sector.
Figure 5:
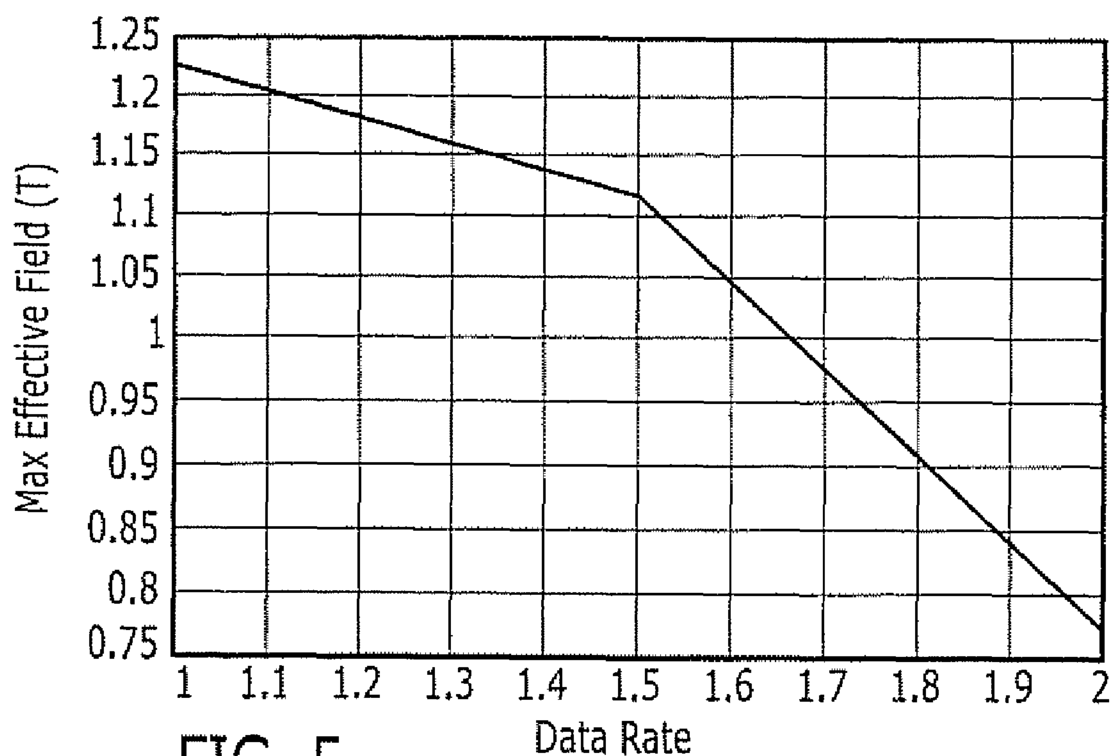
FIG. 5 is a graph of maximum magnetic field of a disk media versus data rate.
Figure 6:
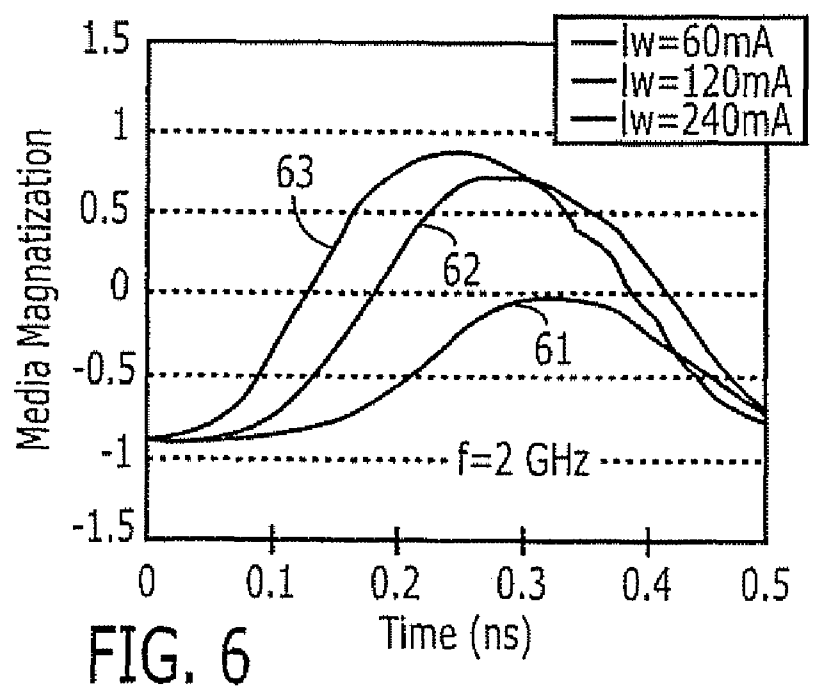
FIG. 6 is a graph of media magnetization versus time for various write current levels.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the term "and/or" includes any and all combinations of one or more of the associated listed items. In the drawings, the size and relative sizes of regions may be exaggerated for clarity.

Some embodiments of the present invention provide disk drives and methods. Accordingly, the present invention may be embodied in hardware and/or in software (including firmware, resident software, micro-code, etc.). Consequently, as used herein, the term "signal" may take the form of a continuous waveform and/or discrete value(s), such as digital value(s) in a memory or register. Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The present invention is described below with reference to block diagrams, including operational flow charts, of disk drives and methods according to various embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 7:
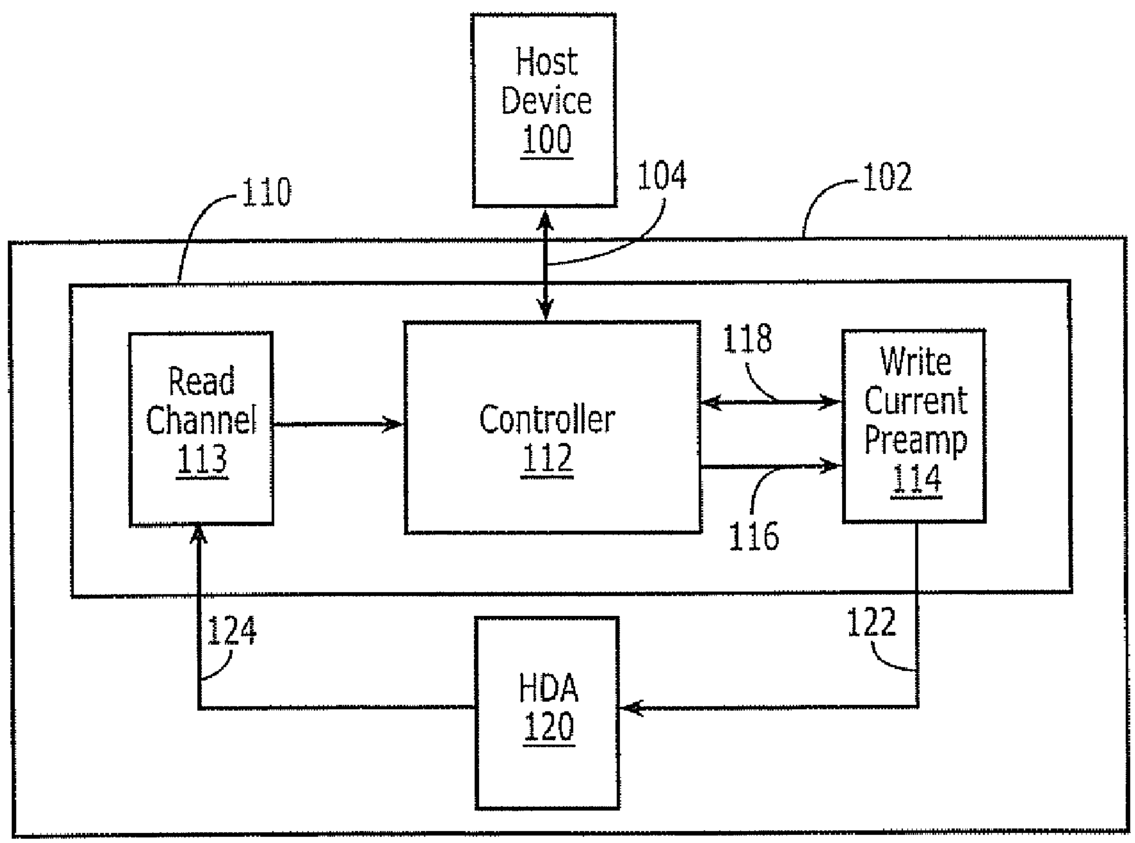
FIG. 7 is a block diagram of a host device that is connected to a disk drive that is configured in accordance with various embodiments of the present invention.

FIG. 7 is a block diagram of a host device 100 that is connected to a disk drive 102, which may be configured as was described for the disk drive 10 of FIG. 1, and which is configured to generate a write current in accordance with various embodiments of the present invention. Data 104 can be transferred from the host device 100 to the disk drive 102 for storage, and can be retrieved from the disk drive 102 and transferred to the host device 100. The disk drive 102 includes drive electronic circuits 110, which can include the electronic circuits 30 of FIG. 1, and a head disk assembly 120 ("HDA"), which can include the disk(s) 12, actuator assembly 18, voice coil motor 28, spin motor 14, and head(s) 20 of FIG. 1.

The electronic circuits 110 can include a controller 112, a read channel 113, and a write current preamplifier 114. The controller 112 can include a data controller and a servo controller which may reside in one or more integrated circuits.

The read channel 113 includes a read element in the head 20 and an amplifier, and can operate in a conventional manner to convert data from the analog read signal 124 from the read element in the head 20 to the digital form used by the controller 112. The head 20 generates the read signal 124 based on servo information (including preamble and servo burst patterns) and data on the disk 12. The controller 112 uses the servo information in the read signal 124 to perform seek and track following operations of the head 20 relative to the data tracks 40. The controller 112 communicates the data in the read signal 124 to the host device 100.

The controller 112 formats data that is to be written on the disk 12, and provides a representative data signal 116 to the preamplifier 114 for writing on the disk 12. In response to the data signal 116, the preamplifier 114 generates a write current 122 that is provided to, for example, a coil in the head 20 to generate a magnetic flux that writes the corresponding data to the disk 12.

According to some embodiments of the present invention, the preamplifier 114 generates the write current 122 based on a write current command 118 from the controller 112. The shape of the write current 122 is controlled by the controller 112 and/or the preamplifier 114. As used herein, the "shape" of the write current 122 can include, but is not limited to, magnitude of the write current 118, amount of overshoot of a leading edge of the generated write current 118 beyond a defined magnitude, and/or width of the overshoot of the leading edge of the generated write current 118 beyond the defined magnitude.

Figure 8:
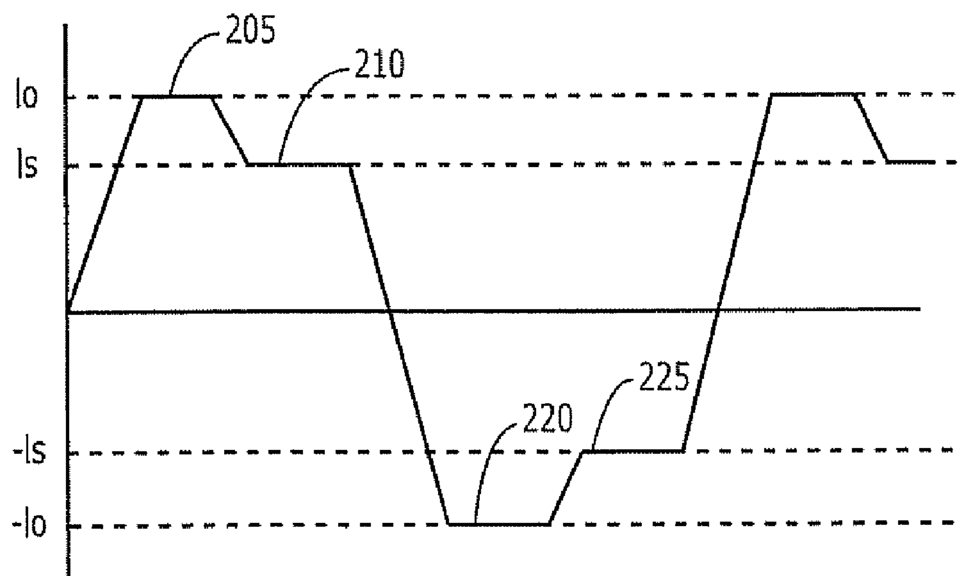
FIG. 8 is a graph of write current versus time showing current overshoot.

Current overshoots are used to provide an adequate field rise time in order to generate a sufficient magnetic field in the disk media at high data rates. A current waveform with an overshoot is illustrated in FIG. 8. As discussed above, data is written onto a magnetic media, such as a magnetic disk, by providing an alternating write current to a write head 20. In order to write a magnetic field having a first polarity onto the disk media using a write current waveform including overshoot, the write current is initially raised to an overshoot current level Io for an initial period 205. While only moderate amounts of current may be needed to generate an adequate write field, large currents may be needed to obtain an adequate field rise time for high data rates. The overshoot current Io may thus decrease the field rise time in the magnetic media (i.e. the slope of the magnetization is increased). The current is then lowered to a steady state current level 210 of Is while the data is written to the disk. In order to write a magnetic transition onto the media, the write current is reversed, and is initially lowered to an overshoot current level –Io for a period 220, and then is raised to a steady state level 225 of –Is. Stated differently, in order to write a magnetic transition onto the disk, a current signal having an opposite polarity from the previous current signal is applied to the write head 20. The magnitude of the current signal is initially large to provide a current overshoot 220. After the current overshoot 220, the magnitude of the current signal is reduced to a steady state level 225 of –Is.

Returning to FIG. 7, although the write current command 118 is illustrated as a single path, it is to be understood that the write current command 118 can include a plurality of separate commands that may be communicated between the controller 112 and preamplifier 114 via a plurality of dedicated or time-multiplexed conductive paths.

In some embodiments of the present invention, the controller 112 uses the write current command 118 to set an initial shape of the write current 122 that is to be generated by the preamplifier 114. The preamplifier 114 can then, for example, vary the shape of the write current 122 to provide a desired current waveform. Accordingly, in response to individual write current commands 118, the preamplifier 114 can sequentially vary the magnitude, amount of overshoot, and/or width of overshoot of the write current 122, and to maintain the write current at each of the levels for a sufficient amount of time to write a plurality of data bits through the head 20 to the disk 12.

According to some embodiments of the invention, a write current waveform used to write a magnetic signal to a magnetic media includes a reverse current preshoot that may be followed by a current overshoot. During the write process, before writing a magnetic transition onto the disk media, the reverse current preshoot perturbs the write head by applying a small initial increase in write current in a direction opposite to the direction required to write the magnetic transition. That is, the reverse current preshoot may effectively generate a spin perturbation in the write head that may be equivalent to heating the magnetic spin system. Following the reverse current preshoot, the current is reversed and a current overshoot Io may be applied for a predetermined time interval, followed by a steady state (DC) current Is. The reverse preshoot write current level may be substantial. For example, in some embodiments, the reverse preshoot write current level may have a magnitude that is at least about 10% greater than the steady state current level Is. In some embodiments, the reverse preshoot write current level may exceed the steady state current level Is by an amount that is at least about 10% of the level by which the overshoot current Io exceeds the steady state current level Is.

Figure 9:
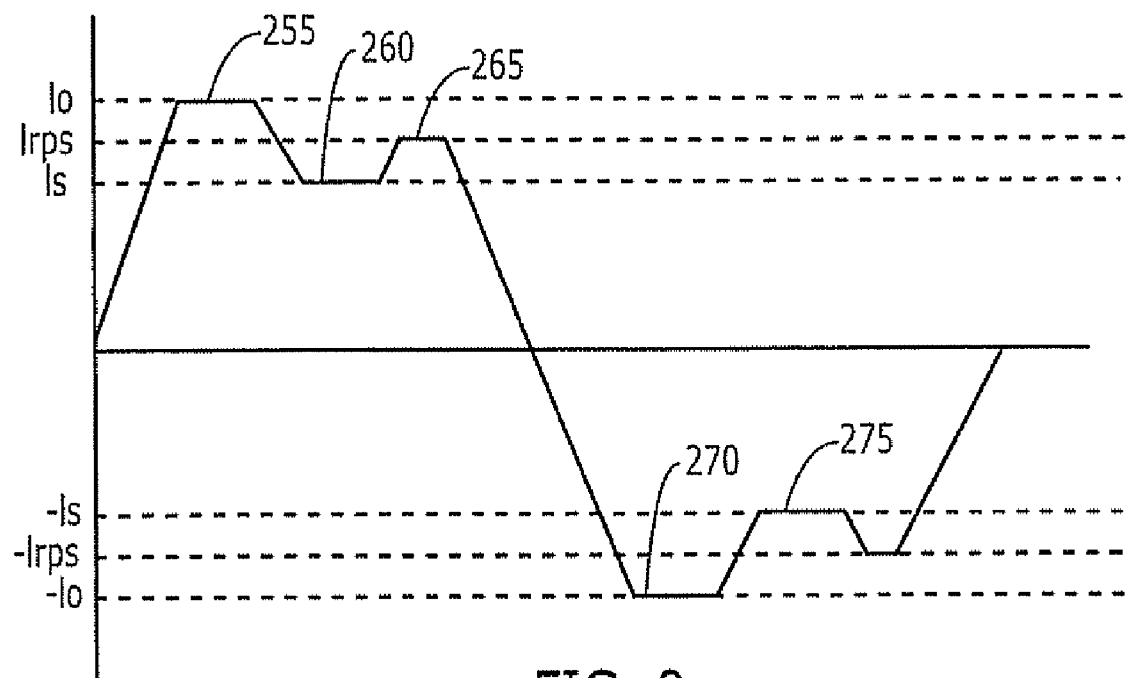
FIG. 9 is a graph of write current versus time showing reverse current preshoot according to some embodiments of the invention.

A reverse current preshoot is illustrated in FIG. 9. As shown therein, in order to write a magnetic field having a first polarity onto the disk media, the write current is initially raised to an overshoot current level Io for an initial period 255. The current is then lowered to a steady state current level Is 260 while the data is written to the disk. In order to write a magnetic transition onto the media, before the write current is reversed, a reverse current preshoot 265 to a reverse current preshoot level Irps is applied before the write current is lowered to an overshoot current level −Io 270. While Irps is shown in FIG. 9 as being less than Io, Irps may in some embodiments of the invention by greater than or equal to Io.

As shown in FIG. 9, the reverse current preshoot signal is applied just before the current overshoot signal in a direction opposite to the direction that is required to write the magnetic transition onto the disk media. By applying the reverse current preshoot 265, the magnitude of the current overshoot Io may be reduced while still generating an increased magnetization level in the disk media compared to a current signal with no overshoot. Since the magnitude of the current overshoot Io may be reduced, the magnetic write width of the signal may be reduced, which may result in reduced adjacent track erasures.

As noted above, the reverse current preshoot may generate a spin perturbation in the write head prior to the current overshoot. It is presently believed that the "hot" magnetic spin system will respond more quickly to the overshoot, thus potentially requiring a smaller overshoot amplitude. As discussed above, smaller overshoot amplitude may result in reduced adjacent track erasures.

For example, for writing a 1T (high frequency) pattern on a disk media, the current waveform in the head will typically be more sinusoidal (i.e. no detectable current overshoot). However, due to the presence of the reverse current preshoot (and corresponding lower adjacent track erasure) a higher current amplitude may be used to write the 1T pattern, thus resulting in a better pattern on the disk media.

Figure 10:
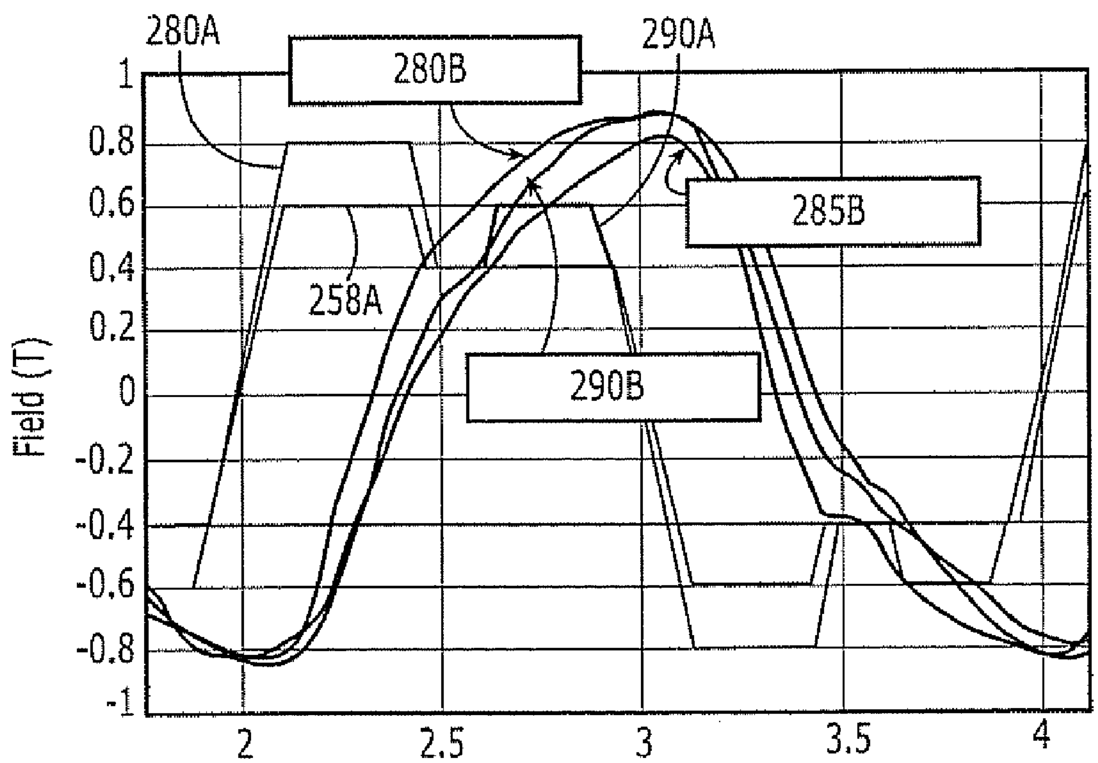
FIG. 10 is a graph of write current and media magnetization versus time for a current signal including reverse current preshoot according to some embodiments of the invention.

FIG. 10 illustrates a simulated current signal and resulting magnetic field for a write current signal with a reverse current preshoot according to some embodiments of the invention, along with two comparative examples with no reverse current preshoot. As shown therein, a first write current signal (Curve 280A) including a high current overshoot of 80 mA, a DC current of 4 OmA and no reverse current preshoot produces a magnetic field in the media of about 0.82T (Curve 280B). A second write current signal (Curve 285A) including a medium current overshoot of 60 mA, a DC current of 40mA and no reverse current preshoot produces a magnetic field in the media of less than 0.8T (Curve 285B). However, a write current signal (Curve 290A) including a reverse current preshoot of 60 mA followed by a medium current overshoot of 6 mA and a DC current of 40 mA produces a magnetic field in the media of about 0.82T (Curve 290B), i.e. comparable to the field generated by the first write current signal, but with lower current overshoot.

Figure 11:
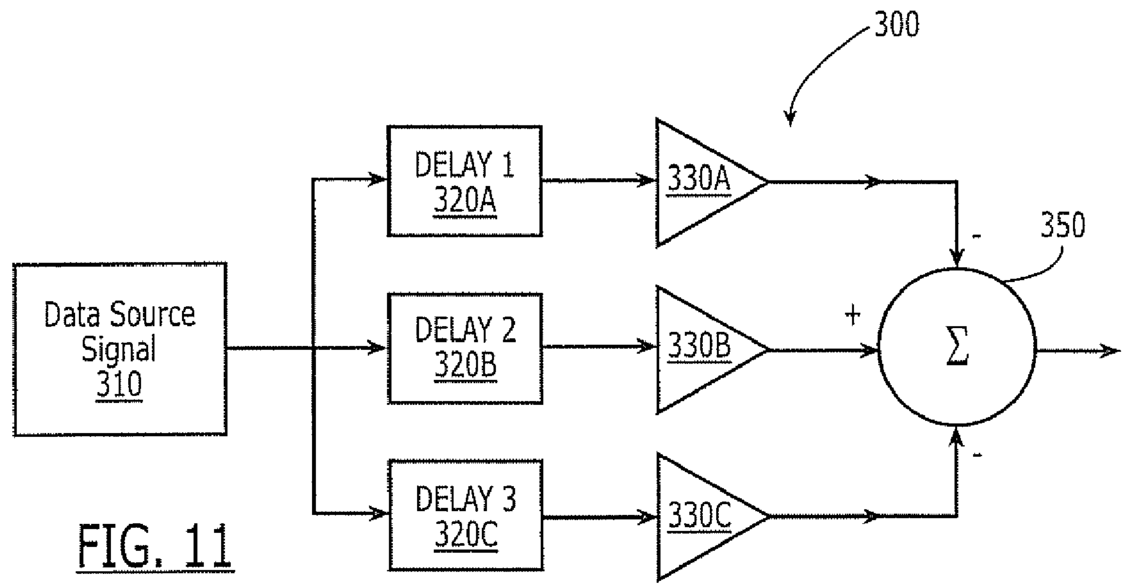
FIGS. 11 and 12 are block diagrams of write current preamps configured according to some embodiments of the invention.

The controller 112 and/or the write current preamp 114 may include a write current generator 300 configured to generate an appropriate current command to provide a reverse current preshoot by summing several copies of a data input signal, each of which has a particular scaling and delay, as shown in FIG. 11, which is a block diagram illustrating systems and/or methods according to some embodiments of the invention. As shown therein, a data source signal 310 is provided to a first signal path including a first delay element 320A and a first scaler 330A, a second signal path including a second delay element 320B and a second scaler 330B and a third signal path including a third delay element 320C and a third scaler 330C. The delay of the first delay element 320A may be less than the delay of the second delay element 320B, which may in turn be less than the delay of the third delay element 320C. The signals produced by the first second and third signal paths are combined at a summing node 350. In particular, the signals from the first and third signal paths may be subtracted, while the signal from the second signal path may be added. Thus, assuming that a positive current is needed to write a magnetic transition on the disk media, the signal from the first signal path (negative sign) is applied first as a reverse current preshoot, while the signal from the second signal path (positive sign) defines the current overshoot. The signal from the third signal path (negative sign) reduces the current to the steady state signal level.

Figure 12:
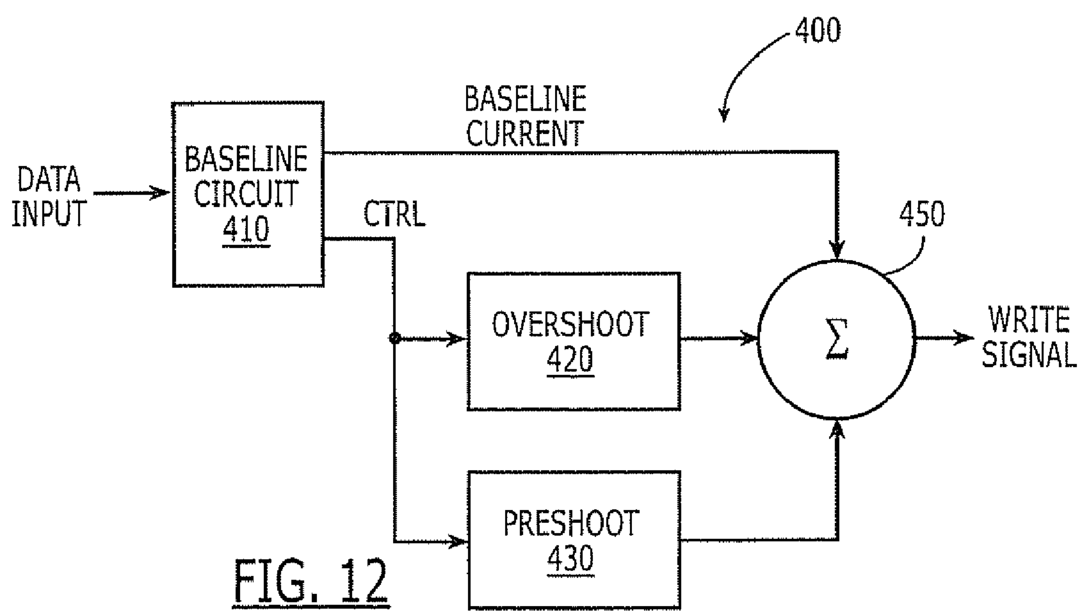

A write current generator 400 for generating a write current including a reverse current preshoot according to further embodiments of the invention is shown in FIG. 12, which is a block diagram illustrating systems and/or methods according to further embodiments of the invention. As shown therein, a data input is provided to a baseline circuit block 410, which generates a baseline current signal, as well as a control signal CTRL for controlling an overshoot block 420 and a preshoot block 430. Signals output by the baseline circuit 410, the overshoot circuit 420 and the preshoot circuit 430 are combined at a summing node 450 to produce a write current signal.

Figure 13A:
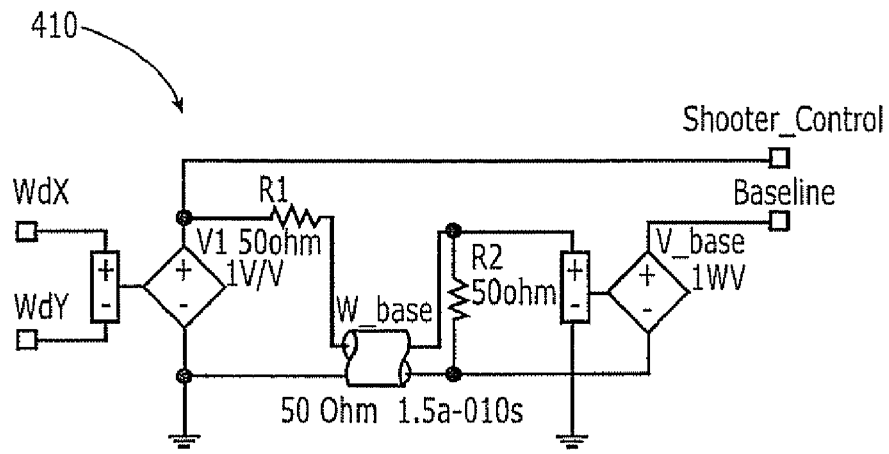
FIGS. 13A-13C are block diagrams of components of a write current preamp configured according to some embodiments of the invention.
Figure 13B:
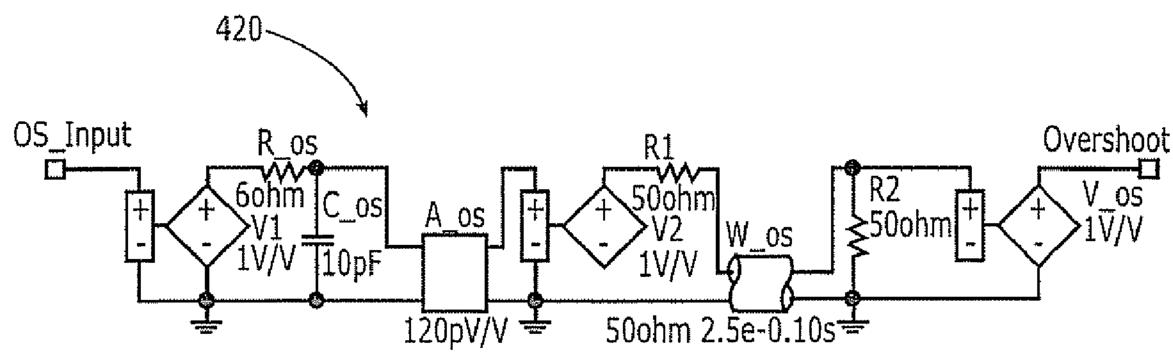
Figure 13C:
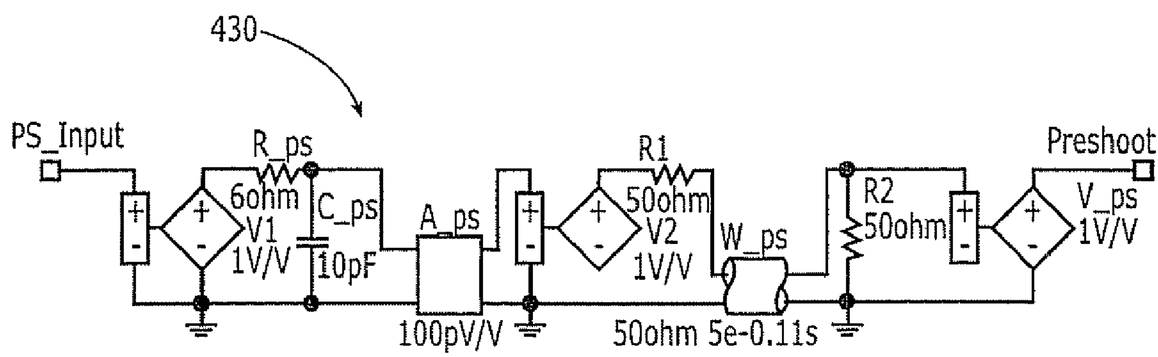

FIGS. 13A-13C are circuit diagrams of a baseline circuit 410, an overshoot circuit 420 and a preshoot circuit 430, respectively, according to some embodiments of the invention. Referring to FIG. 13A, the baseline circuit 410 buffers the input data and outputs a signal that is proportional to the input data pattern. The elements R1, R2 and W-base represent a time delay element that causes the baseline current signal to be applied after the preshoot. The Shooter_Control output signal, which corresponds to the CTRL signal of FIG. 14, drives the overshoot block 420 and the preshoot block 430.

Referring to FIG. 13B, the overshoot circuit block 420 receives an input signal that is proportional to the input data. The signal is lowpass filtered through R_os and C_os, which adjusts the width of the overshoot signal. The resulting filtered signal is differentiated through A_os, which creates an overshoot pulse with sharp, narrow pulse characteristics. Further, the height of the overshoot pulse can be adjusted by changing the gain of A_os. The signal is then buffered and placed through a delay element including R1, R2 and W_Os. The output of the overshoot circuit 420 is provided to the summing node 450 (FIG. 12).

Referring to FIG. 13C, the preshoot circuit 430 may be similar to the overshoot circuit 420 shown in FIG. 15B, except that the input data is inverted. The inverted input data is lowpass filtered though R_ps and C_ps, and is then differentiated through A_ps to provide a desired pulse characteristic for the preshoot pulse. The height of the preshoot pulse may be adjusted by changing the gain of A_ps. The signal is then buffered and placed through a delay element including R1, R2 and W_ps, which provides the shortest delay of the three circuits shown in FIG. 12. The output of the preshoot circuit 430 is provided to the summing node 450 (FIG. 12).

Figure 14A:
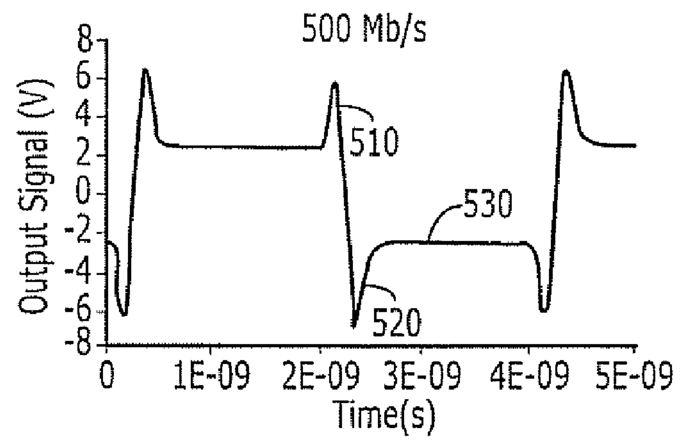
FIGS. 14A-14C are graphs of simulated write currents including reverse current preshoot according to some embodiments of the invention.
Figure 14B:
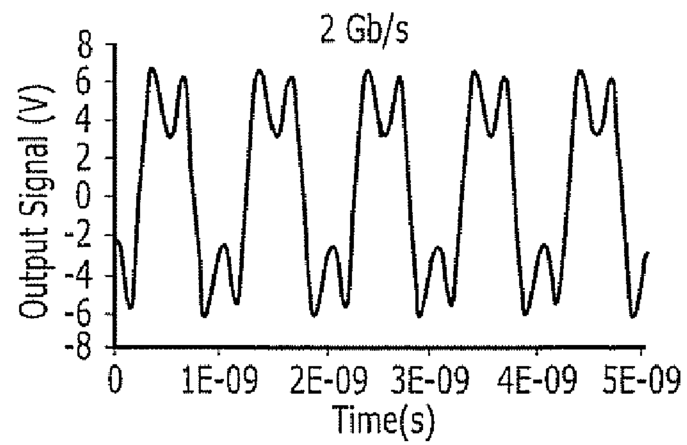
Figure 14C:
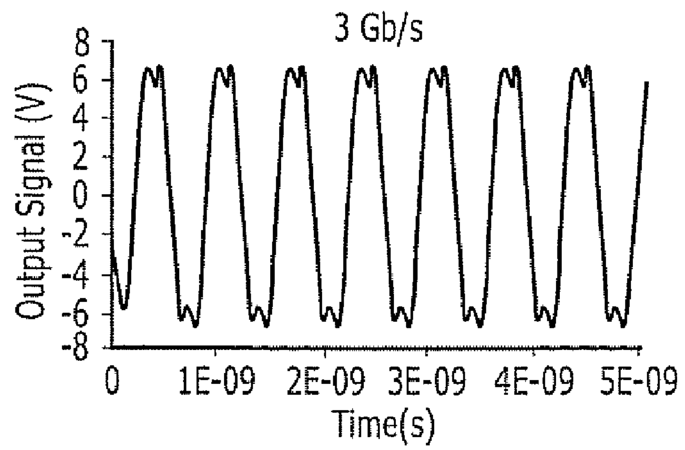

FIGS. 14A-C are exemplary plots showing modeled behavior of a current preamp circuit configured according to embodiments of the invention and producing a 1T pattern. As seen therein, each magnetic transition is characterized by a reverse current preshoot signal 510 followed by an opposite polarity overshoot current signal 520. Thus, each half of the waveform possesses a dual peak configuration including a peak corresponding to an overshoot current signal 520 followed by a peak corresponding to a reverse current preshoot signal 510. At lower data rates, a steady state current signal 530 is evident between the overshoot current signal 520 and the next successive reverse current preshoot signal 510. As the data rate increases, the overshoot and preshoot begin to merge, and the current signal begins to appear more sinusoidal. However, distinct peaks for the overshoot and preshoot current signals are still evident.

In addition to increasing the magnetic field in the disk media with reduced adjacent track erasure, embodiments of the invention may reduce power consumption in the write current preamp 114, because power dissipation is proportional to the square of the voltage applied to the preamp 114. Thus, in some embodiments of the invention, the peak power consumed by the preamp 114 may be about half that of a conventional preamp.

Figure 15:
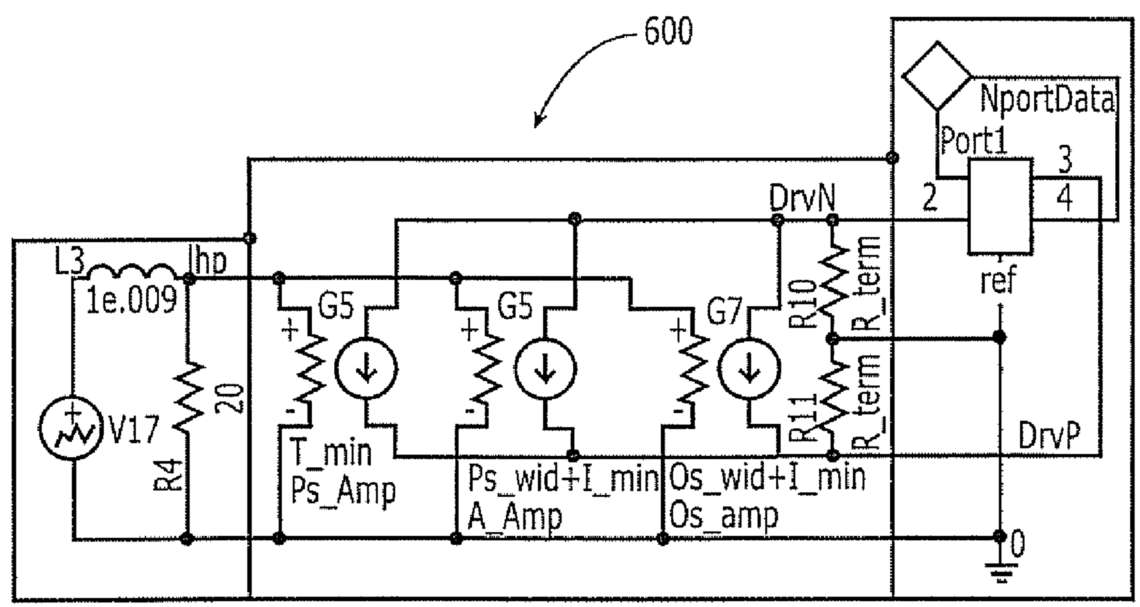
FIG. 15 is a schematic circuit diagram of elements of a write current preamplifier configured according to some embodiments of the invention.
Figure 16A:
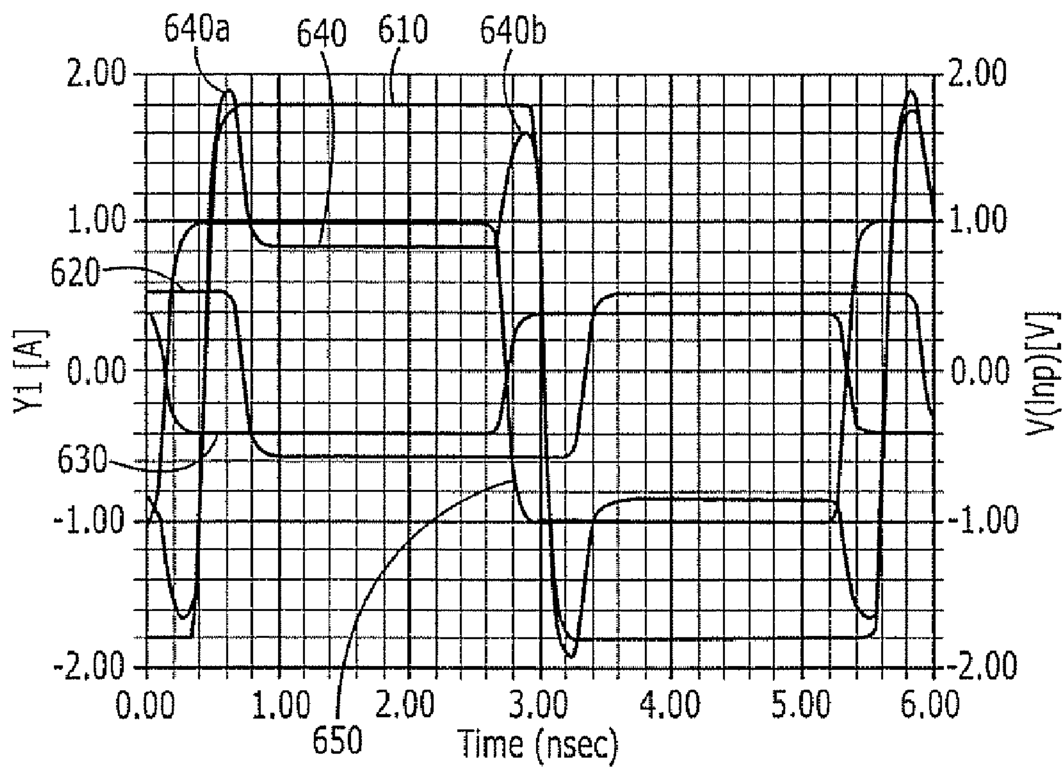
FIGS. 16A-16B are graphs of simulated control currents and write currents including reverse current preshoot according to some embodiments of the invention.
Figure 16B:
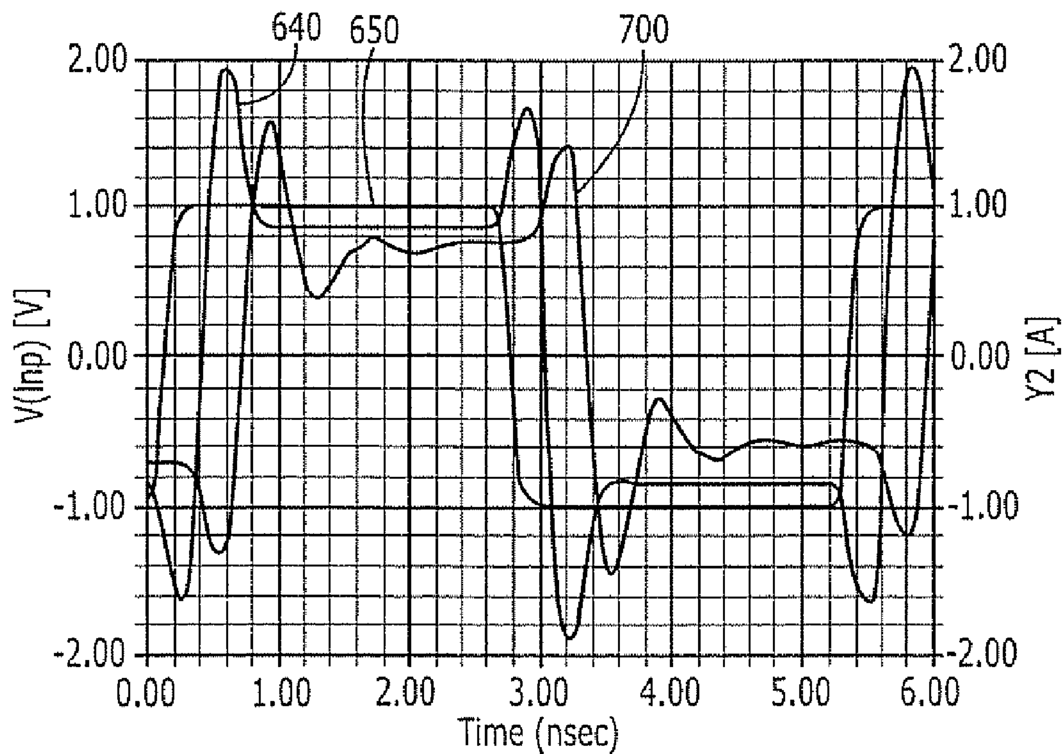

FIG. 15 is a schematic circuit diagram of elements of a write current preamplifier configured according to some embodiments of the invention, and FIGS. 16A-16B are graphs of simulated control currents and write currents including reverse current preshoot according to some embodiments of the invention. In particular, FIG. 15 illustrates a circuit 600 for generating a write current signal with preshoot. A symmetric data voltage Inp is generated by the circuit including a voltage source V17. The data voltage Inp is input to three current generators G5, G6, and G7, that are connected so that their individual current outputs add. The current generator G5 generates a preshoot signal, the current generator G6 generates a steady state signal, and the current generator G7 generates an overshoot signal. The resistors R10 and R11 form a balanced ground reference to the system and also provide a back match to the transmission line by which the output current is provided to the write head, as is known in the art. The output terminals DrvP and DrvN of the source are connected via interconnect NportData, which delivers current to the recording head element via Port1.

Each current generator responds individually to the generator signal Inp by generating a delayed (e.g. by a delay $T_{+}$min, Ps_wid+T_min, or Os_wid_Ps_wid_T_min) and scaled current, as shown in FIG. 16A. The resulting current 700 in the write head is shown in FIG. 16B. As shown therein, the steady state signal 610 generated by current generator G6, the overshoot signal 620 generated by the current generator G7 and the preshoot signal 630 generated by the current generator G5 combine to form an input current signal 640 that includes an overshoot peak 640*a* and a reverse preshoot peak 640*b*. The outputs of the current generators G5, G6 and G7 are scaled to provide desired peak and steady state current levels. The input voltage, which switches between +1V and −1V, is shown as curve 650.

An equivalent circuit to the one shown in FIG. 15 may be constructed by a variety of techniques, including Norton equivalence techniques, Thevenin equivalence techniques, and/or a mixture of the two. Furthermore, each balanced source may be created using a technique known as H-bridge.

Other methods for generating the reverse preshoot current may be used in which current sources G5, G6 and G7 are summed as in the circuit 600 illustrated in FIG. 15, but with different timing mechanisms. For example, the values shown in Table 1 may be defined as follows

TABLE 1

| Data Values | |
|---|---|
| Value | Definition |
| A | Input data, a digital signal switching between two symmetric voltages (e.g. −1 V and +1 V) |
| B | Copy of A that is time-delayed by a time PsDur (the preshoot duration) |
| C | Copy of B that is time-delayed by a time OsDur (the overshoot duration) |

Furthermore, a logical operation F may be defined to be TRUE only when A is low and C is high, and a logical operation G may be defined that is TRUE only when A is high and C is low. Then, the input to G5 (the preshoot amplifier) is B only when F is TRUE and B is high or when G is TRUE and B is low. Otherwise, the input to G5 is zero. The input to G6 (the DC amplifier) is just B. The input to G7 (the overshoot amplifier) is B only when G is TRUE and B is high or when F is TRUE and B is low. Otherwise, the input to G7 is zero. The outputs of the current generators G5, G6 and G7 are scaled to provide desired peak and steady state current levels. In the case where the scale factor Ps_amp is equal to the scale factor Os_amp, this method may reduce the number of current sources needed to two (e.g. G5 and G6), where G6 is controlled as before, while the input to G5 is B only when F or G is TRUE, and is zero otherwise.

Other baseline, overshoot, and preshoot signals and means of combining those signals to achieve the desired waveform are possible using a variety of techniques known to those skilled in the art.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of generating a write current comprising:
writing a single data transition on a magnetic data storage medium by:
generating a first overshoot current having a first polarity;
generating a first steady state current having the first polarity and is less than the first overshoot current;
generating a second overshoot current having the first polarity and is greater than the first steady state current; and then
generating a second steady state current having a second polarity that is opposite the first polarity in order to write a magnetic transition on a data storage medium.

2. The method of claim 1, further comprising:
receiving a write command; and
generating the write current in response to the write command.

3. The method of claim 1, wherein the second overshoot current has a magnitude that is greater than a magnitude of the first overshoot current.

4. The method of claim 1, wherein the second overshoot current has a magnitude that is less than or about equal to a magnitude of the first overshoot current.

5. The method of claim 1, wherein the second overshoot current has a magnitude that is at least about 10% greater than a magnitude of the first steady state current.

6. The method of claim 1, wherein the second overshoot current has a magnitude that exceeds a magnitude of the first steady state current by an amount that is at least about 10% of an amount by which the first overshoot current exceeds the first steady state current.

7. The method of claim 1, wherein generating the second overshoot current comprises generating a data source signal, delaying the data source signal, and scaling the data source signal; and
wherein generating the first overshoot current comprises delaying the data source signal by a second delay that is longer than the first delay and scaling the data source signal by a second scale factor; and wherein the method further comprises combining the second overshoot current and the first overshoot current.

8. The method of claim 7, further comprising:

generating a third current signal by delaying the data source signal by a third delay that is longer than the second delay and scaling the data source signal by a third scale factor; and combining the third current signal with the first overshoot current and the second overshoot current.

9. A circuit comprising:

a write current generator configured to generate, in the following specific order: a first overshoot current greater than a first steady state current, the first steady state current, a second overshoot current greater than the first steady state current, and a second steady state current having a first polarity that is opposite a second polarity of the first steady state current, the first overshoot current, and the second overshoot current.

10. The circuit of claim 9, wherein the write current generator is further configured to generate a second steady state current having the second polarity, and to apply the second steady state current after applying the first overshoot current, the first steady state current, and the second overshoot current.

11. The circuit of claim 10, wherein the write current generator is further configured to generate a third overshoot current having a polarity that is the same as the second steady state current, and to apply the third overshoot current after the second overshoot current.

12. The circuit of claim 9, wherein the write current generator comprises:

a baseline circuit configured to receive an input data signal and to responsively generate a baseline current signal and a control signal;

a second overshoot current circuit configured to generate a second overshoot current signal in response to the control signal; and a combiner configured to combine the baseline current signal and the second overshoot current signal.

13. The circuit of claim 12, wherein the write current generator further comprises:

an overshoot circuit configured to generate the first overshoot current in response to the control signal;

wherein the combiner is further configured to combine the first overshoot current with the baseline current signal and the second overshoot current signal.

14. The circuit of claim 12, wherein the second overshoot current circuit is configured to invert the input data signal, to filter the input data signal, and to differentiate the input data signal, and to delay the input data signal to provide the second overshoot current signal.

15. The circuit of claim 9, wherein the write current generator comprises:

a current generator configured to generate the second overshoot current in response to the write command;

a current generator configured to generate the first steady state current in response to the write command, wherein the first steady state current is delayed relative to the second overshoot current.

16. A device comprising:

a write current generator configured to perform the following to write a single magnetic transition:

generate a first steady state current and a second steady state current that has an opposite polarity of the first steady state current;

generate a first overshoot current that has a larger magnitude than the first steady state current and a second overshoot current that also has a larger magnitude than the first steady state current, the first and second overshoots both having a same polarity as the first steady state current;

apply the first overshoot current, the first steady state current, the second overshoot current, and the second steady state current in the following specific order:

apply the first overshoot current;

apply the first steady state current;

apply the second overshoot current; and then switch to apply the second steady state current to write the single magnetic transition on a data storage medium.

17. The device of claim 16 further comprising the write current generator configured to:

generate a third overshoot current having a same polarity as the second steady state current and has a larger magnitude than the second steady state current; and apply the third overshoot current after applying the second overshoot circuit and prior to applying the second steady state current.

18. The circuit of claim 16 wherein the write current generator further comprises:

a first current generator for generating the first overshoot signal;

a second current generator for generating the first steady state signal;

a third current generator for generating the second overshoot signal; and a combiner coupled to the first current generator, the second current generator, and the third current generator, the combiner configured to sum the first overshoot signal, the first steady state signal, and the second overshoot signal.

19. The device of claim 18 wherein the write current generator further comprises a time delay element and wherein the write current generator is further configured to apply a time delay to the second overshoot signal.

* * * * *